Nov. 8, 1949 J. E. OWEN Re. 23,166

LOADING DEVICE FOR TRUCKS OR OTHER MOBILE VEHICLES

Original Filed June 18, 1946 5 Sheets-Sheet 1

INVENTOR.

James E. Owen

BY Victor J. Evans & Co.

ATTORNEYS

LOADING DEVICE FOR TRUCKS OR OTHER MOBILE VEHICLES

Original Filed June 18, 1946 5 Sheets-Sheet 2

INVENTOR.

James E. Owen

BY Victor J. Evans & Co.

ATTORNEYS

LOADING DEVICE FOR TRUCKS OR OTHER MOBILE VEHICLES

Original Filed June 18, 1946 5 Sheets-Sheet 3

INVENTOR.

James E. Owen

BY Victor J. Evans & Co.

ATTORNEYS

LOADING DEVICE FOR TRUCKS OR OTHER MOBILE VEHICLES

Original Filed June 18, 1946 5 Sheets-Sheet 4

INVENTOR.

James E. Owen

BY Victor J. Evans & Co.

ATTORNEYS

LOADING DEVICE FOR TRUCKS OR OTHER MOBILE VEHICLES

Original Filed June 18, 1946 5 Sheets-Sheet 5

INVENTOR.

James E. Owen

BY Victor J. Evans & Co.

ATTORNEYS

Reissued Nov. 8, 1949

Re. 23,166

UNITED STATES PATENT OFFICE 23,166

LOADING DEVICE FOR TRUCKS OR OTHER MOBILE VEHICLES

James Edward Owen, Asheville, N. C., assignor to Owen Foundation, Incorporated, Buncombe County, N. C.

Original No. 2,441,591, dated May 18, 1948, Serial No. 677,543, June 18, 1946. Application for reissue June 13, 1949, Serial No. 102,382

8 Claims. (Cl. 214—78)

This invention relates to a loading device which is particularly designed to provide a device which installed on a truck or other vehicle will permit the operator thereof to load his truck without the use of additional equipment.

The use of such a load cuts loading and digging costs since it eliminates the need of extra equipment. It will have time since trucks so equipped will not have to stand in line to be filled.

An object of the invention is to provide a loader that is durable in use operated by hydraulic action having a minimum of moving parts which will perform its tasks in an expeditious and efficient manner and can be installed on any type of conventional truck or other vehicle in use at the present time.

With the above and other objects and advantages in view the invention consists of the novel details of construction, arrangement and combination of parts more fully hereinafter described, claimed and illustrated in the accompanying drawings in which:

Figure 18:
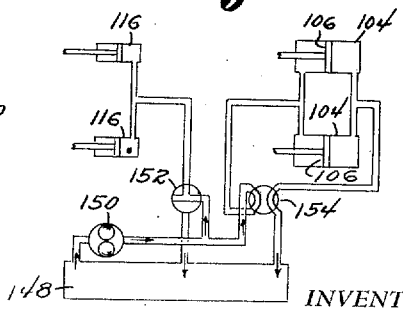

Figures 13 to 17 inclusive are diagrammatical views of the loader in operation; and Figure 18 is a diagrammatical view of the hydraulic control system.

Referring more in detail to the drawing the reference numeral 20 designates a dump or similar truck to which the loader embodying the invention is attached.

Figure 1:
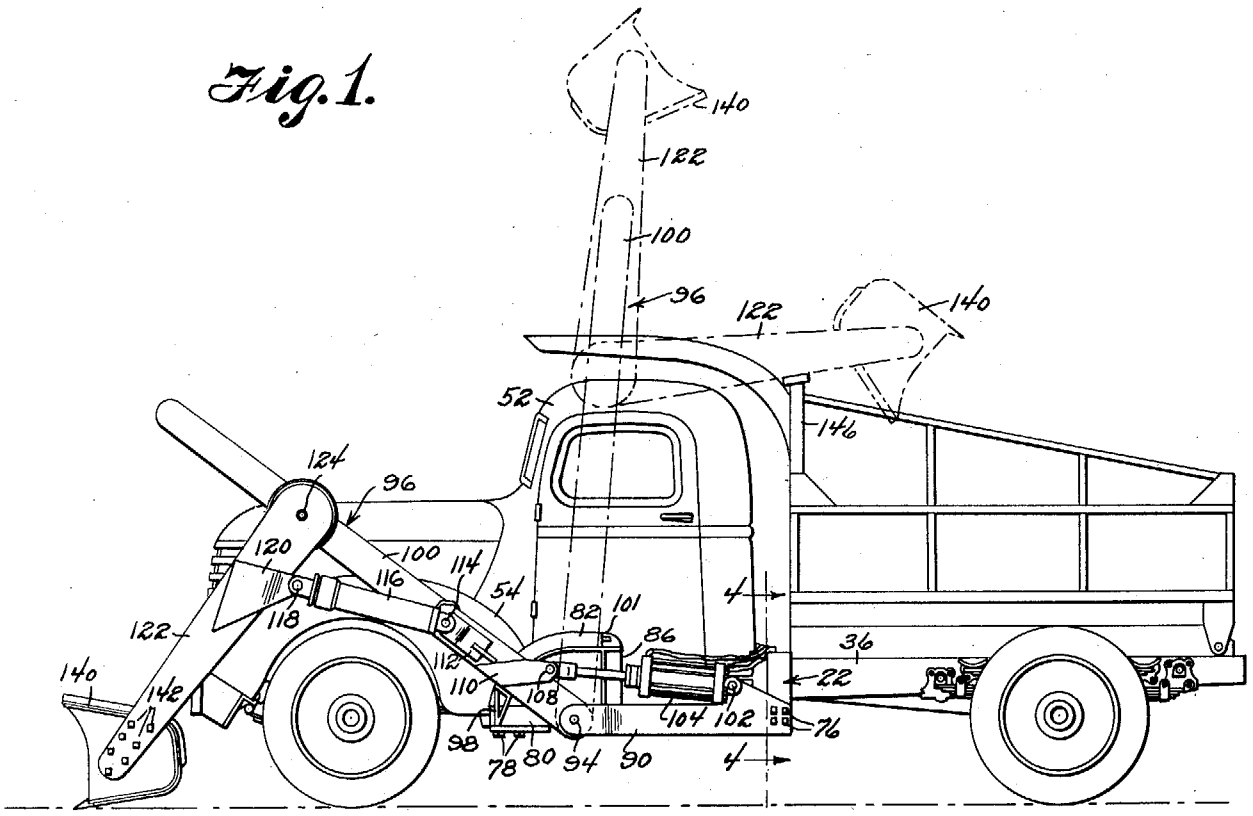
Figure 1 is an elevational view of an embodiment of the invention installed on a dump truck.
Figure 2:
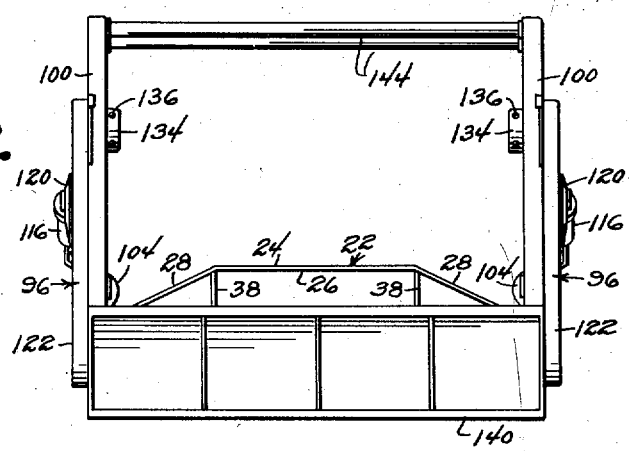
Figure 2 is a front view of the loader per se.
Figure 3:
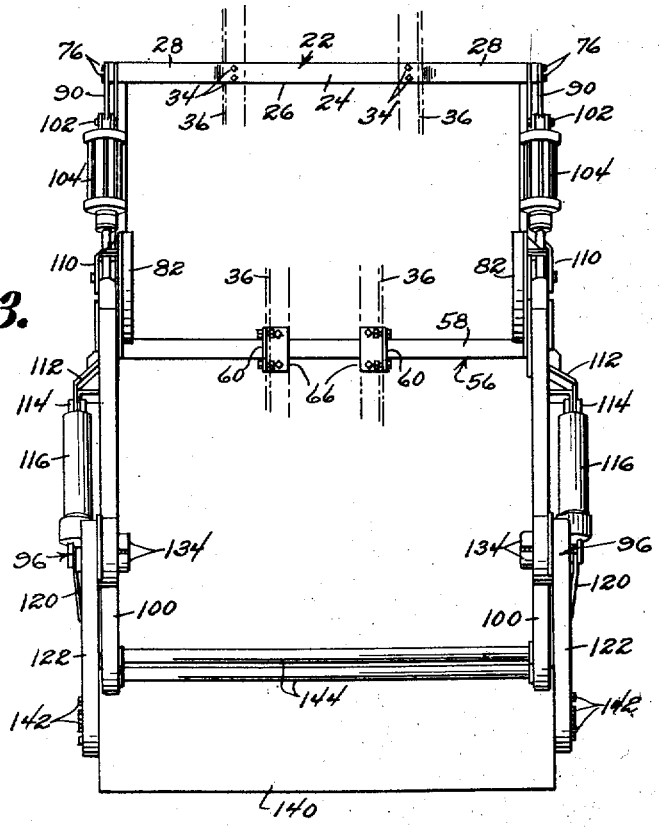
Figure 3 is a top plan view thereof.
Figure 4:
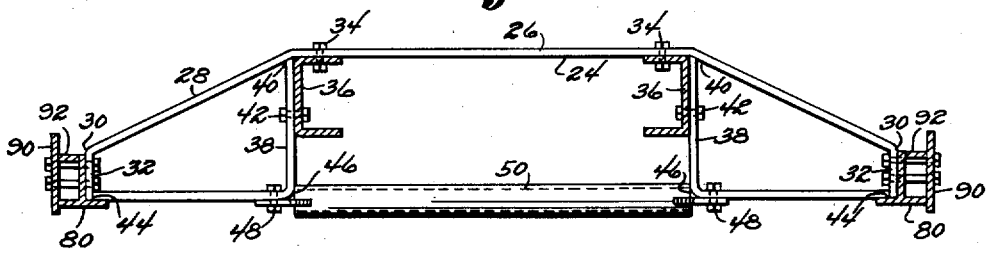
Figure 4 is a sectional view on the line 4—4 of Figure 1.

The means for mounting the loader on the truck comprises a rear saddle 22 as best shown in Figure 4 which comprises the top bar 24 having the straight portion 26 and inclined portions 28 which are bent downward at 30 to form the aligned vertical portions 32.

The straight portion 26 is secured at 34 to the upper longitudinal edge of the truck frame channel members 36 and angular members 38 are secured by welding or the like at 40 to the straight portion 26, at 42 to the vertical sides of the members 36, and at 44 to the lower end of the portions 32.

Secured to the members 38 at their point of angularity 46 by fasteners 48 is the tubular tie rod 50 and the saddle 22 is positioned or mounted on the truck directly below the rearmost transverse edge of the cab 52 of the truck 20.

Figure 5:
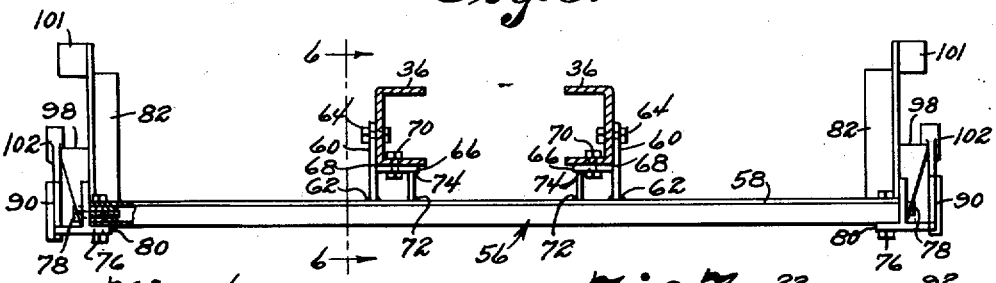
Figure 5 is an elevational view of the front saddle.
Figure 6:
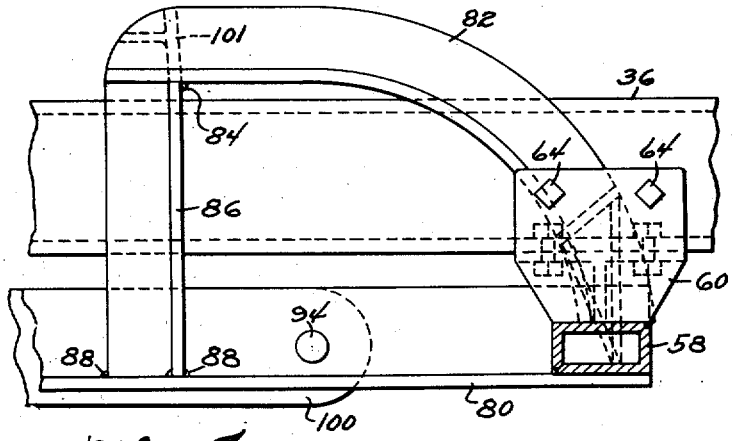
Figure 6 is a sectional view on the line 6—6 of Figure 5.
Figure 7:
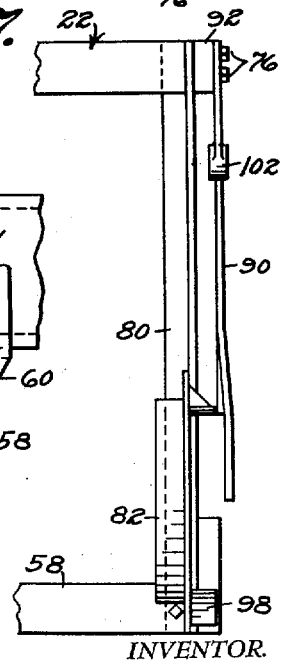
Figure 7 is a top plan view of the bar and supports connecting front and rear saddles.
Figure 8:
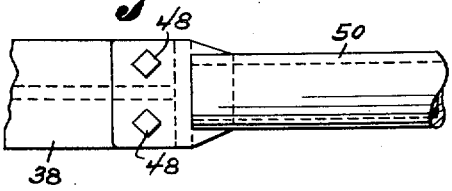
Figure 8 is a detailed fragmentary view of one end of the tie rod.
Figure 9:
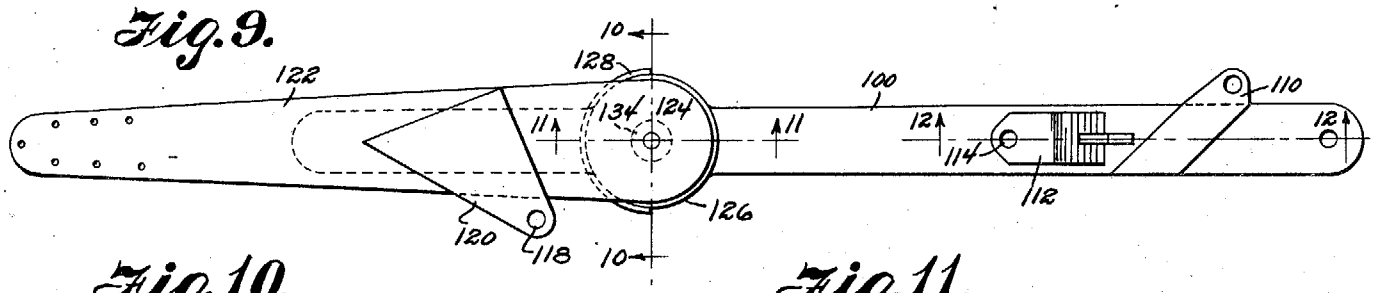
Figure 9 is an elevational view of a side arm.
Figure 11:
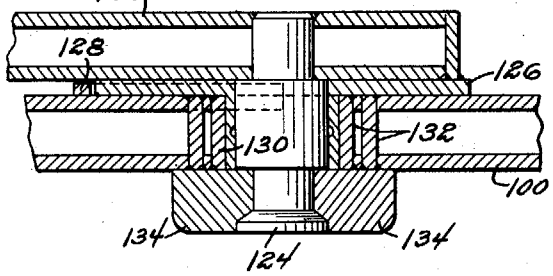
Figure 11 is a sectional view on the line 11—11 of Figure 9.
Figure 12:
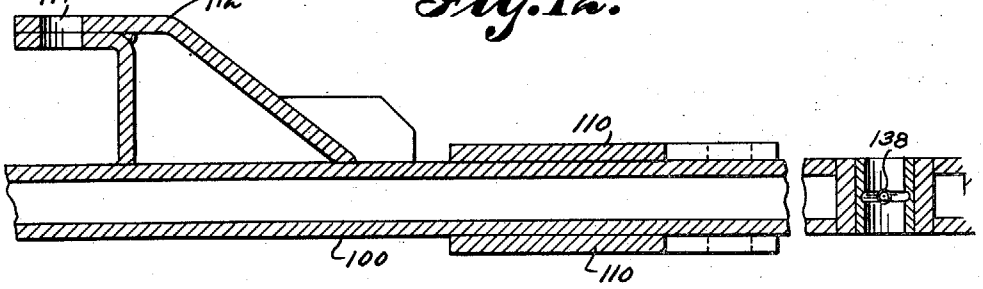
Figure 12 is a sectional view on the line 12—12 of Figure 9.
Figure 10:
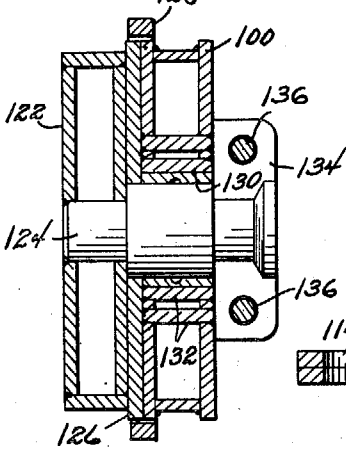
Figure 10 is a sectional view on the line 10—10 of Figure 9.
Figure 13:
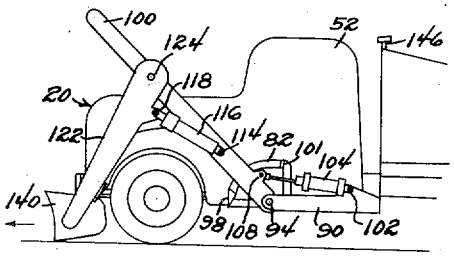
Figure 14:
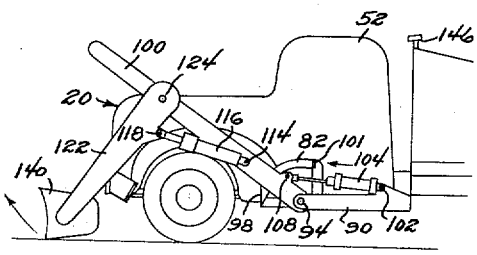
Figure 15:
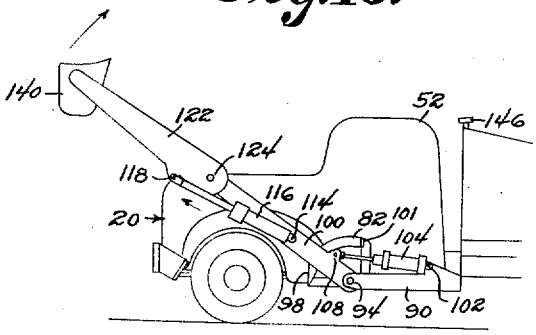
Figure 16:
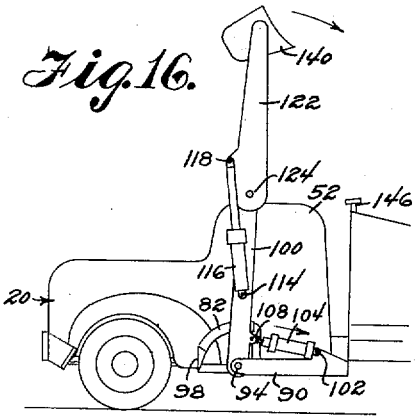
Figure 17:
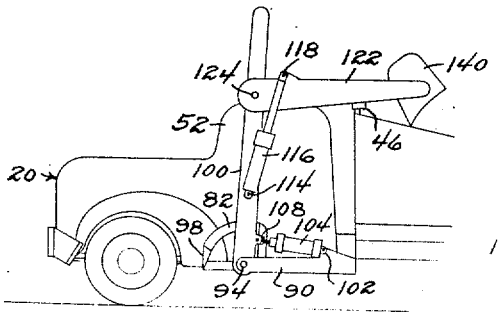

Mounted forwardly of the saddle 22 at the rear edge of the front fenders 54 of the truck 20 is the under frame 56 which is best seen in Figure 5 and this frame comprises the horizontally disposed beam 58 having the vertical members 60 secured at 62 to the beam 58 and at 64 to the truck frame 36. A plate 66 underlies the frame 36 and secured thereto at 68 to the member 60 and at 70 to the frame 36 and a short vertical member spaced from in parallel relation with the members 60 is secured by welding or the like at 72 to the beam 58 and at 74 by welding or the like to the plate 66.

Secured to the outer opposite ends of the beam 58 and to the portions 32 at 76 and 78 respectively are the inverted T-bars 80 which form the side frames and supports for the loader.

Secured by welding to the bars 80 adjacent the ends of the beam 58 are the arcuate arms 82 which are secured by welding or the like at 84 to the vertical bar 86 which is secured at 88 to the bars 80. Secured in contact with the bars 80 by the same securing means for the bars are the arms 90 and spacers 92 are positioned intermediate the arms 90 and the bars 80 to compensate for the base of the bars and to align the arms 90. At the forward end of the arms 90 a shaft 94 journaled in the arms and in the bars 80 pivotally mount the A frame 96 thereon and a triangular brace 98 secured to the forward end of the bars 80 act as stops for the lifting arms 100 for the A frame 96 as well as stops 101 secured by welding to the members 82.

Pivoted on the arms 90 at 102 are the hydraulic units comprising cylinders 104 having the pistons 106 therein which are connected at 108 to the plate 110 welded to the arms 100 adjacent the pivot 94 and the cylinders 104 cause the actuation of the arms through the proper manipulation of controls mounted in the cab 50 at a convenient location to the driver thereof.

Secured to the arms 100 adjacent the plate 110 are the brackets 112 to which are connected at 114 the hydraulic units or rams 116 which are connected at 118 to the triangular plates 120 secured to the second arms 122 which are pivoted at 124 to the lifting arms 100 and a bearing plate 126 is mounted on the pivot 124 intermediate of the arms 100 and 122. A semicircular flange 128 connected to the lifting arm 100 is spaced from and follows the contour of the plate 126. A bearing 130 is secured by welding in the arm 100 and retained therein by circular rings or braces 132 secured interiorly of the arms 100 and sectional nuts 134 are secured on the pivot 124 by bolts 136. The pivot 94 is provided with a lubrication fitting 138 in the arms 100 and a bucket 140 is secured to the free ends of the second arms 122 by fasteners 142 and tubular spacing members 144 are secured to the free ends of the arms 100.

Secured to the rear of the cab 50 on the dump body of the truck 20 are T-shaped supports 146 on which the second arms 122 rest when the loader is in position for movement of the truck.

The loader operates by hydraulic pressure using oil and the arrangement for the operation of the loader is shown in Figure 18 wherein there is shown the reservoir tank 148 connected to the pump 150 which in turn is connected to control valves 152 and 154, valve 152 being for the operation of rams 116 and valve 154 for the operation of cylinders 104.

Thus when in operation the loader is driven into a pile of dirt or other material to be moved and the bucket is pushed into the dirt to be filled and then elevated to dump the contents thereof into the truck.

Thus the driver can load his truck and after the loading thereof position the loader in carrying position and move the truck to further dump the contents thereof at any desired location.

It is believed that the operation and construction of the invention will be apparent to those skilled in the art and it is to be understood that changes in the details of construction, operation and arrangement of parts may be resorted to provided they fall within the spirit of the invention and the scope of the appended claims.

Having thus described the invention, what is claimed as new and desired to be secured by Letters Patent is:

1. A device of the character described, in combination with a truck having a body and a frame, comprising transverse parallel saddles secured to the frame below the body, side frame secured to said saddles at the outer ends thereof on opposite sides of said chassis in parallel relation to each other, A-frames secured to said side frames at the forward ends thereof, hydraulically actuated cylinders pivotally connected to said A-frames and said side frames for the raising and lowering of said A-frames, parallel spaced arms pivotally connected to said A-frames, a bucket secured to the free ends of said arms, a hydraulically actuated cylinder connected to said arm frame and said arms for the raising and lowering of said arms, and means for supporting said arms when said A-frame is in raised position.

2. The invention as in claim 1, wherein stops are provided on said side frames for limiting the movement of said A-frames.

3. The invention as in claim 1, wherein brackets are provided on said arms, and said A-frame for connecting the hydraulic cylinders thereto.

4. A loading attachment for trucks having a body and a frame, comprising a vertical swinging A-frame, saddles on said truck frame, side frames connected to the opposite ends of said saddles for supporting said A-frame forwardly of the truck body, a pair of parallel opposed arms pivotally connected to the opposite sides of said A-frame, and adapted for vertical swinging movement with regard to said truck frame, on opposite sides thereof, a bucket secured to the forward ends of said arms, hydraulically actuated cylinders connected to said side frames and said A-frame for the raising and lowering of said A-frame, hydraulically operated cylinders connected to said arms and said A-frame for the raising and lowering of said arms, and means on said body for supporting said arms when in full raised position.

5. The combination with the frame of a vehicle of the character described of a lifting arm on each side of said frame, means supporting said lifting arms on said frame for rocking movement about an axis extending transversely of said frame, a second arm carried by each lifting arm, said second arms being mounted, respectively, for rocking movement about a second axis parallel to the axis about which the lifting arms may be rocked, a bucket mounted upon the free ends of said second arms, means for rocking said lifting arms about said first mentioned axis, and hydraulic mechanism including a hydraulically operable unit connected to each lifting arm and the second arm associated therewith, for effecting simultaneous angular movement of said second arms and bucket about said second axis under the close control of the operator.

6. The combination with the frame of a vehicle of the character described of a lifting arm on each side of said frame, means supporting said lifting arms on said frame for rocking movement about an axis extending transversely of said frame, a second arm carried by each lifting arm, said second arms being mounted, respectively, for rocking movement about a second axis parallel to the axis about which the lifting arms may be rocked, a bucket mounted upon the free ends of said second arms, and hydraulic mechanism for simultaneously rocking said lifting arms about said first mentioned axis and for independently rocking said second arms simultaneously about said second axis, said mechanism including a hydraulically operable unit connected to each lifting arm and the second arm associated therewith, said units being operable in unison to effect simultaneous rocking movement of said second arms and bucket under the close control of the operator.

7. The combination set forth in claim 6 in which each of said hydraulically actuated units comprises a cylinder and a piston and piston rod working therein, the cylinder being pivotally connected to one of said arms and the piston and piston rod being pivotally connected to the associated arm.

8. The combination with the frame of a vehicle having thereon means defining an operator's station, of a load receiving bucket, and mechanism for moving said bucket from a digging position forwardly of the frame at the ground level upwardly and rearwardly over the operator's station to a dumping position and returning the same to digging position, said mechanism including a lifting member on each side of the frame, each such member being supported on the frame in such manner that a portion thereof may be moved forwardly and rearwardly of the truck frame, means for actuating said lifting members in unison, an arm mounted on each such member for rocking movement relatively thereto, said load receiving bucket being rigidly mounted upon and connecting said arms, and hydraulic mechanism for rocking said arms and moving said bucket independently of said lifting members, said mechanism including a hydraulically operable unit connected to each arm and to its associated lifting member, and means for supplying said unit with fluid under pressure, said means being under the close control of the operator.

JAMES EDWARD OWEN.

No references cited.